United States Patent [19]
Molinaro et al.

[11] Patent Number: 5,358,094
[45] Date of Patent: Oct. 25, 1994

[54] CONVEYOR BELT WITH ADVERTISEMENTS

[76] Inventors: Joseph J. Molinaro, 204 Amber Oaks, Sherwood, Ark. 72120; Mark A. Witcher, 30 Greenhaven Pl., Jacksonville, Ark. 72076

[21] Appl. No.: 242,283

[22] Filed: May 13, 1994

[51] Int. Cl.[5] .............................................. B65G 43/00
[52] U.S. Cl. ................................. 198/502.1; 40/524; 186/68
[58] Field of Search .............. 198/502.1, 803.01, 691; 40/524, 514, 594, 611; 186/68, 69

[56] References Cited

U.S. PATENT DOCUMENTS

| | | |
|---|---|---|
| 3,754,342 | 8/1973 | Santacrece et al. |
| 3,849,918 | 11/1974 | Mazzocco, Sr. ........................ 40/32 |
| 4,225,369 | 9/1980 | Felchlin ............................. 40/611 X |
| 4,333,255 | 6/1982 | Ward .................................... 40/524 |
| 4,979,591 | 12/1990 | Habegger et al. ...................... 186/68 |
| 5,102,172 | 4/1992 | Saetre ................................... 283/117 |
| 5,165,526 | 11/1992 | Conklin, Jr. .......................... 198/804 |
| 5,207,011 | 5/1993 | Coulthard ............................... 40/594 |
| 5,244,080 | 9/1993 | Bierbaum ............................ 198/502.1 |
| 5,248,536 | 9/1993 | Du Katz ............................. 40/594 X |

FOREIGN PATENT DOCUMENTS

| | | |
|---|---|---|
| 509102 | 10/1930 | Fed. Rep. of Germany . |
| 2115414 | 11/1978 | Fed. Rep. of Germany ........ 40/472 |
| 699488 | 12/1930 | France ................................... 40/472 |

*Primary Examiner*—Cheryl L. Gastineau
*Attorney, Agent, or Firm*—Ray F. Cox

[57] ABSTRACT

A conveyor belt of the type used at checkout counters at retail establishments is adapted to the changeable display of advertising material on the visible surface of the conveyor belt. Static cling sheets bearing advertising indicia are adhered to the conveyor belt by electrostatic attraction. As an alternative embodiment, a low friction coating is applied to the visible surface of the static cling sheets. An additional alterative embodiment adds a strip of adhesive material between the conveyor belt and the leading edge of the static cling sheet for releasably securing the leading edge to the conveyor belt.

6 Claims, 2 Drawing Sheets

CONVEYOR BELT WITH ADVERTISEMENTS

BACKGROUND OF THE INVENTION

The present invention relates to conveyor belts of the types employed at checkout counters for grocery stores, department stores and the like. The present invention particularly relates to such conveyor belts having means to display advertising materials on their visible surfaces.

Checkout counters employing conveyor belts for transporting goods placed on them toward a checkout position are commonly employed in many types of retail establishments, particularly in grocery stores. It is also a common phenomenon that retail establishments, and in particular grocery stores, employ every available means to advertise their wares to shoppers. Even at checkout counters advertisements and displays of merchandise are often employed to bring new products to the attention of shoppers and to stimulate impulse buying.

It has been suggested that the conveyor belts employed at checkout counters provide a vehicle for the display of advertising materials to shoppers who are waiting to have their purchases checked out. For example, in U.S. Pat. No. 4,979,591 issued to Habegger, et al. on Dec. 25, 1990 for "Conveyor Belt", a conveyor belt is disclosed which is provided with advertising indicia on a visible surface thereof. Habegger discloses advertising indicia which are imprinted directly on the outer surface of the conveyor belt and thereafter coated with a clear layer of protective plastic material. The primary function of the layer of clear plastic material is to protect the surface of the conveyor belt containing the advertising indicia from abrasion and scratches, therefore increasing the service life of the advertising indicia.

A similar concept is disclosed in U.S. Pat. No. 5,165,526 issued to Conklin, Jr. on Nov. 24, 1992 for "Conveyor System With Panels Containing Visual Information." Conklin discloses a conveyor, such as a baggage carousel, having transparent panels to the underside of which visual information is affixed. Conklin further discloses a co-pending application in which the visual information is printed on a sheet of thin slippery material which is attached to the top surface of the panels on the conveyor.

In similar fashion continuous display devices which are only intended to provide continuous moving displays without the added function of conveying articles have been disclosed in various patents. U.S. Pat. No. 4,333,255 issued to Ward on Jun. 8, 1982 for "Advertising Display Apparatus" discloses an endless carrier mounting a plurality of display panels. Furthermore, U.S. Pat. No. 3,849,918 issued to Mazzocco, Sr. on Nov. 26, 1974 for "Continuous Display Device" discloses a continuously moving display device having a series of panels, each containing separate visual displays. The panels of Mazzocco comprise a permanent portion and a removable portion which further comprises a pair of rectangular sheets of flexible transparent plastic or similar material. The flexible transparent plastic materials are sealed along their lower and side edges to form a pocket in which a display sheet containing printed, pictorial or other visual material to be displayed is contained.

The use of static cling materials has been suggested as a means of pictorial display and for other purposes. For example, U.S. Pat. No. 5,102,171 issued to Saetre on Apr. 7, 1992 for "Static Cling Greeting Card" discloses a greeting card constructed of panels of sheetform material. A thin sheet of static cling vinyl is electrostatically adhered to the smooth and nonporous surface of the sheetform material. The sheet of static cling vinyl may be peeled from the sheetform material and adhered to other smooth, nonporous surfaces to display printing on the sheet.

A display apparatus utilizing a plurality of electrostatic display strips is disclosed in U.S. Pat. No. 5,207,011 issued to Coulthard on May 4, 1993 for "Display System with Changeable Display Elements." The display apparatus of Coulthard includes a translucent display panel, a matte panel having apertures disposed over the display panel, and a plurality of display strips have electrostatic characteristics releasably attached over the apertures.

In U.S. Pat. No. 5,248,536 issued to DuKatz on Sep. 28, 1993 for "Apparatus for Displaying Removable Indicia", an apparatus is disclosed which includes a base sheet to support individual removable indicia, a transparent cover sheet borne by the base sheet and adhesive which releasably affixes the base sheet and the transparent sheet together.

It may thus be seen that static cling materials have considerable utility in the removable display of pictorial materials such as advertising copy. Static cling materials having advertising indicia imprinted thereon may be easily placed and removed from a suitable base material. However, the use of static cling materials in placing advertising on moving conveyor belts must overcome a number of potential problems; for example, affixing static cling materials in such a fashion as to prevent the material from being peeled away from the base while at the same time avoiding a too permanent fixation of the static cling materials to the conveyor belt.

It is thus an object of the present invention to provide for a conveyor belt of the type commonly employed in the checkout counters of retail establishments which is adapted to the changeable display of advertising materials.

It is a further object of the present invention to provide for the display of advertising material on checkout counter conveyor belts which may easily be affixed, removed and replaced as required.

It is an additional object of the present invention to provide for the display of advertising material on the conveyor belts of checkout counters which is resistent to peeling, tearing, and premature removal from the conveyor belt.

SUMMARY OF THE INVENTION

The present invention works in conjunction with a form of conveyor belt of the type used at checkout counters at retail establishments. The present invention is adapted to the display of advertising material on the visible surface of the conveyor belt. The advertising material thus presented is particularly well suited to attracting the attention of shoppers waiting at the checkout counter.

According to the present invention, a conveyor belt may be modified to display advertising materials. The present invention may be employed with all types of conveyor belts and, in particular, those types of conveyor belts which are used to convey merchandise at retail checkout counters, for example, grocery stores. It is important to note, however, that some conveyor belts are specially treated with anti-static materials. The present invention may not work effectively with such treated anti-static conveyor belts.

Conveyor belts are typically constructed of rubber or flexible plastic materials with a flexible fabric or fiber backing. The surfaces of such conveyor belts are typically smooth and nonporous. Thin, flexible sheets of materials such as vinyl will tend to cling to the smooth nonporous surface of the conveyor belt by electrostatic attraction. The static cling characteristics of various materials such as vinyl, polyester, polypropylene, and polyethylene terephthalate are well known. Advertising materials may be imprinted on such sheets of static cling material which are then adhered to the surface of the conveyor belt by electrostatic attraction. The advertising material is then easily visible to customers waiting to be checked out at the checkout counter. Since the static cling material is releasable, it may be removed and replaced with new advertising materials as often as desired.

As an alternative embodiment of the present invention, strips of releasable adhesive material may be applied between the visible surface of the conveyor belt and the static cling materials. Such releasable adhesive material may be employed along the leading edge of a sheet of static cling material to prevent the material from being peeled back as the conveyor belt moves forward along its cycle of movement. As a further alternative embodiment of the present invention, the surface of the static cling material, after being adhered to the surface of the conveyor belt, may be treated with a slip agent to prevent merchandise, particularly that contained in plastic wrap material, from adhering to the static cling material.

DETAILED DESCRIPTION OF THE PREFERRED EMBODIMENTS

Figure 1:
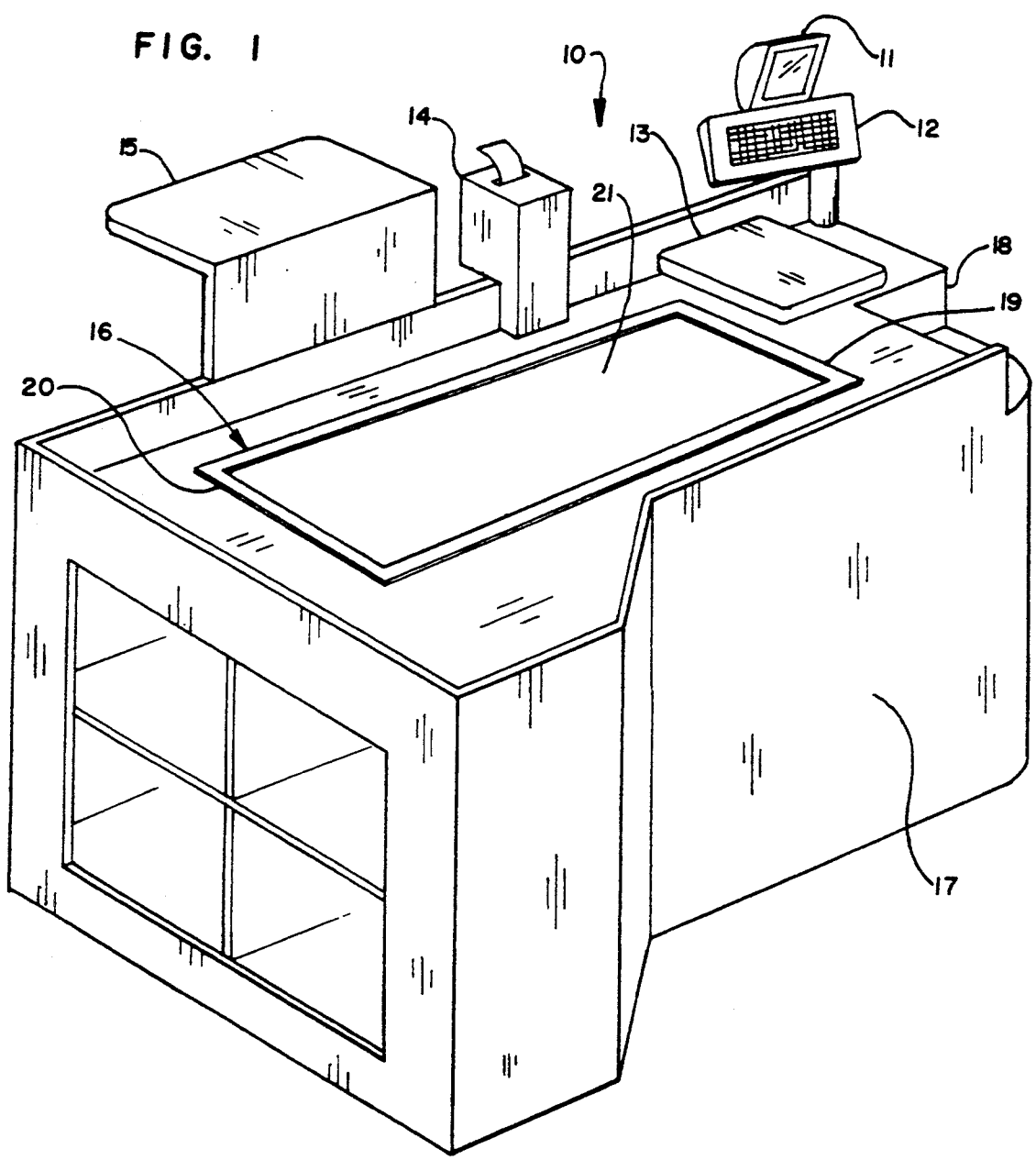
FIG. 1 is a perspective view of a typical checkout counter at a retail establishment showing a belt as modified by the present invention.

With reference to FIG. 1, a typical supermarket checkout counter 10 is shown which includes the standard components, such as CRT monitor 11, keypad 12, scales 13, tape printer 14, check writing platform 15 and conveyor belt 16.

Typically the customer stands in the vicinity of the check writing platform 15 and the checkout person stands in a bay 17 convenient to the receiving end 18 of the checkout counter, the keypad 12 and the scales 13. Goods are taken by the checkout person at the receiving end 18 and either weighed first or placed directly on the input end 19 of the conveyor belt 16. The goods are then conveyed by the motion of the conveyor belt from the receiving end 18 of the checkout counter 10 toward the output end 20 of the conveyor belt 16 where the goods are bagged.

The customer standing near the check writing platform 15 is thus in a perfect position to observe the visible surface 21 of the conveyor belt 16. The conveyor belt 16 forms a continuous loop so that any particular point on the visible surface 21 of the conveyor belt 16 passes repeatedly into view as the conveyor belt 16 moves from the input end 19 toward the output end 20.

Figure 2:
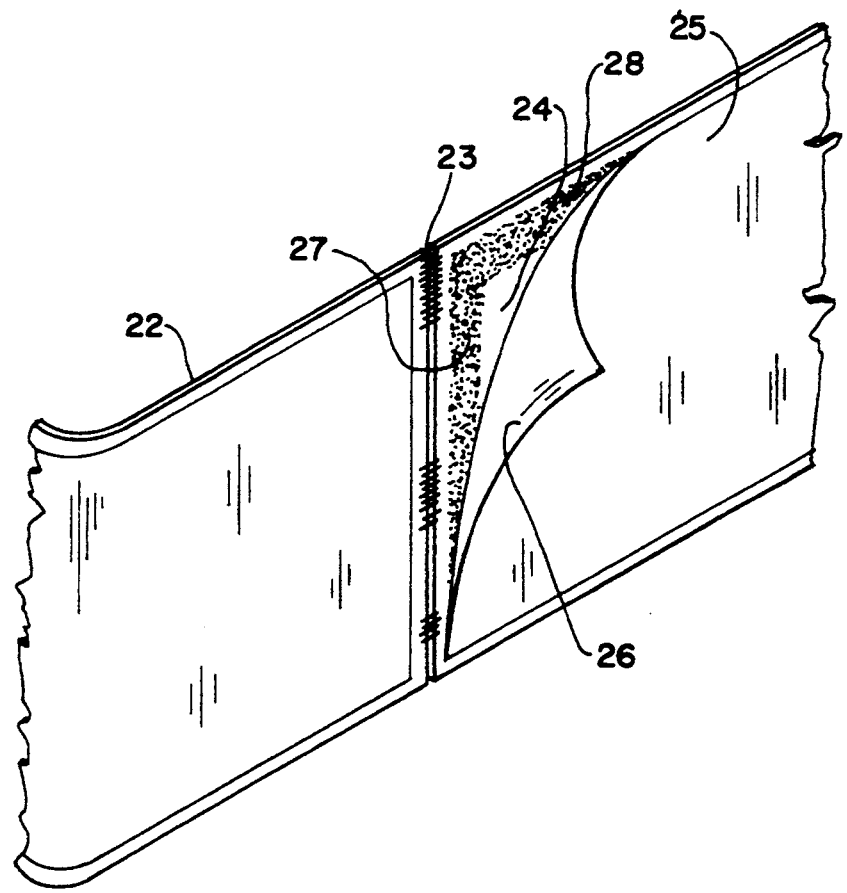
FIG. 2 is a partial isometric view of a conveyor belt as modified to receive advertising materials.
Figure 3:
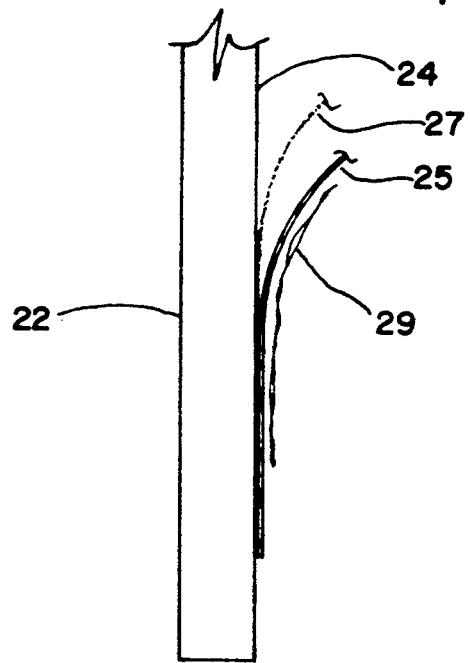
FIG. 3 is a partial sectional view through the conveyor belt.

FIG. 2 shows a portion of the endless loop of the conveyor belt 16. The conveyor belt 16 is constructed of a primary belt 22 which is a flexible multi-ply composition which typically includes fabric and rubber layers. The construction of the primary belt 22 may be of any form and composition of the type well known in the art.

Conveyor belts of the types used at checkout counters typically generate a degree of static charge. In fact, rubber belts passing around endless loops in close contact with friction-generating structures is a standard form of electrostatic generator. Since the electrostatic charge may be a problem in certain applications, certain conveyor belts are treated with anti-static materials and are sold as non-static, anti-static or static resistent belts. Rather than the typical non-static type of conveyor belt, the present invention is designed to work with conveyor belts that are not treated to reduce static. A typical type of conveyor belt that has been found to be effective in the practice of the present invention is a type manufactured by Thermoid and distributed by Belt Services which is described as a 2HROWI type of two-ply poly, slick, static surface, cloth backing belt. Any similar type of belt without static protection may be used in the practice of the present invention.

The primary belt 22 is fastened into an endless loop arrangement using metal staples 23.

The surface 24 of the belt 22 should be smooth and nonporous for maximum holding ability. On such a surface 24 a static cling sheet 25 will naturally adhere due to electrostatic attraction. The static cling sheet 25 may be composed of any of a number of well known smooth flexible materials which have the characteristic of static cling. These materials include vinyl, polyester, polypropylene and polyethylene. This list is not exhaustive of the types of materials which are suitable for the practice of the present invention. All that is required is that the static cling sheet 25 be flexible, amenable to accepting the imprinting of advertising indicia on its surface, and have the characteristic of static cling. Seven mil white static cling vinyl manufactured by United Plastic Film Corporation and having the identifying number CN4700085211 has been found to be a suitable material for use in the present invention.

Advertising material including text and pictorial representations may be imprinted upon the static cling sheet 25 using any of the various methods well known in the prior art. Typically a number of advertisements would appear on each conveyor belt 16. It has been determined that an area of approximately 11 inches by approximately 12 inches is suitable for an individual advertisement. Since conveyor belts 16 of the types used at retail store checkout counters are typically 105-¼ inches long or 122-½ inches long, it has been found to be convenient to imprint groups of approximately 5 advertisements on long strips of static cling sheets 25, each of which would be approximately 5 feet or 6 feet long. Two such strips of static cling sheets 25 would then cover most of the visible surface 24 of a typical conveyor belt 16.

While static cling sheets 25 possess a considerable degree of holding power to the surface 24 of the conveyor belt 16 due to the tremendous force of electrostatic attraction, it is possible that in certain applications additional holding power is required, particularly at the leading edge 26 of the static cling sheet 25. The leading edge 26 is defined as that portion of a static cling sheet 25 which first encounters the output end 20 of the conveyor belt 16. The most likely reason for the static cling sheet 25 to separate from the conveyor belt 16 would involve friction induced by the passage of the leading edge 26 of the static cling sheet 25 under the output end 20 of the conveyor belt 16. The leading edge 26 of the static cling sheet 25 may be subject to a peeling action which would progressively detach the static cling sheet 25 from the surface 24 of the conveyor belt 16. If this event should occur an alternative embodiment of the present invention adds a strip of releasable adhesive material 27 which may be applied between the visible surface 24 of the conveyor belt 16 and the static cling sheet 25. Typically only a limited strip of releasable adhesive 27 may be required along the leading edge 26 of the static cling sheet 25. If necessary, adhesive strips 28 may be applied in other positions between the visible surface 24 and static cling sheet 25. For example, such strips of releasable adhesive material 28 may be applied along the longitudinal edges of the visible surface 24 of the conveyor belt 16, along the trailing edge of the static cling material 25, or intermittently as needed to provide for an adequate degree of attachment of the static cling sheet 25 to the surface 24 without excessive and unwanted disattachment.

The releasable adhesive 27, 28 may be composed of any of a number of releasable adhesive materials which combine the properties of securely holding the static cling sheet 25 to the surface 24 of the conveyor belt 16 without providing a permanent bond. A double sided adhesive transfer tape manufactured by 3M and identified as part no. 950-1 has been found to be suitable for the purpose.

The products conveyed by conveyor belts at retail checkout counters, particularly grocery stores, often include packaging materials made from plastics such as polyethylene terephthalate. Such packaging materials have a high coefficient of friction with static cling materials of the type employed in the present invention. If products packaged in such materials are to be conveyed by the conveyor belt 16 as modified by the present invention, it is desirable to reduce the coefficient of friction between the products being conveyed on the conveyor belt 16 and the static cling sheet 25. Unless the coefficient of friction is suitably reduced, products placed on the static cling sheet 25 may tend to pull the static cling sheet away from the surface 24 of the conveyor belt as the products are placed on or removed from the conveyor belt or upon reaching the output end 20. Such peeling away of the static cling sheet 25 may occur despite the use of releasable adhesive strips 27, 28.

In the eventuality described above, an alternative embodiment of the present invention provides for the application of a slip agent 29 to the static cling sheet 25. The slip agent 29 serves to reduce the coefficient of friction between the static cling sheet 25 and product packaging. An effective slip agent has been found to be Dow Corning 24 emulsion slip agent. The slip agent 29 may be wiped on to the static cling sheet 25 as often as necessary to ensure an appropriately low coefficient of friction.

While the present invention has been described with reference to certain preferred embodiments, a person skilled in the art will understand that these embodiments are exemplary and not by way of limitation to the full scope of the invention as set forth in the appended claims.

What is claimed is:

1. A conveyor belt adapted to the changeable display of advertising materials, comprising:
   (a) a belt for transporting articles placed thereon;
   (b) one or more static cling sheets bearing advertising indicia on a visible surface of said static cling sheets and adhered to an outer surface of said belt by electrostatic attraction.

2. The conveyor belt of claim 1 further comprising a low friction coating applied to said visible surface of said static cling sheets.

3. The conveyor belt of claim 2 further comprising an adhesive strip between said outer surface of said belt and a leading edge of said static cling sheet for releasably securing said leading edge to said belt.

4. The conveyor belt of claim 3 wherein said static cling sheets comprise a material selected from the group of materials consisting of polyester, polypropylene, polyethylene and vinyl.

5. The conveyor belt of claim 4 wherein said low friction coating comprises a slip agent.

6. The conveyor belt of claim 5 wherein said adhesive strip comprises double sided adhesive tape.

* * * * *